United States Patent

[11] 3,595,094

| [72] | Inventor | Pierre Lemor |
| | | Ville D'Avray, France |
| [21] | Appl. No. | 837,077 |
| [22] | Filed | June 27, 1969 |
| [45] | Patented | July 27, 1971 |
| [73] | Assignee | Aktiebolaget Svenska Kullagerfabriken |
| | | Goteborg, Sweden |
| [32] | Priority | June 27, 1968 |
| [33] | | France |
| [31] | | 156,850 |

[54] RACK AND WORM MECHANISM
2 Claims, 2 Drawing Figs.

[52] U.S. Cl. ................................................. 74/89.14,
74/424.8 C, 74/459
[51] Int. Cl. ........................................... F16h 27/02,
F16h 1/18, F16h 55/04
[50] Field of Search ............................................. 74/424.8 C,
424.8 A, 459, 89.14, 89.15

[56] References Cited
UNITED STATES PATENTS
2,683,379  7/1954  Strandgren .................. 74/424.8 C 3,214,991  11/1965  Perrin .......................... 74/424.8 C
FOREIGN PATENTS
8,448  2/1880  Germany ..................... 74/424.8 A Primary Examiner—William F. O'Dea
Assistant Examiner—Wesley S. Ratliff, Jr.
Attorney—Howson and Howson ABSTRACT: Device for transforming a movement of rotation into a movement of translation by means of a high-efficiency rack and worm mechanism characterized in that the rack teeth formed on one portion of a cylinder consist of a multithread tapping of a solid member, in that the worm coaxial with said rack has a number of threads generally equal to that of said rack, and that a plurality of externally screw-threaded planet rollers are disposed around said worm and mesh both with said worm and said rack, the helix angle of the threads formed on said planet rollers threads being the same as that of the worm threads and of opposite direction whereby the planet rollers rolling without slip on the worm are held against any axial movement in relation to said worm.

INVENTOR:
PIERRE LEMOR
BY
Howson & Howson
ATTYS.

RACK AND WORM MECHANISM

BACKGROUND OF THE INVENTION

The present invention relates to a device for transforming a movement of rotation into a movement of translation by means of a high-efficiency rack and worm mechanism.

Conventional motion-transforming mechanisms of the rack and worm type are objectionable in that they develop slipping frictional contacts between the worm threads and the rack teeth.

SUMMARY OF THE INVENTION

It is essential object of the present invention to improve the efficiency of these devices by transforming the movement of relative slipping into a movement of rotation of intermediate members.

To this end, the device for transforming a movement of rotation into a movement of translation by means of a high-efficiency rack and worm mechanism, is characterized in that the rack teeth formed on one portion of a cylinder consist of a multithread tapping of a solid member, in that the worm coaxial with said rack has a number of threads generally equal to that of said rack, and that a plurality of externally screw-threaded planet rollers are disposed around said worm and mesh both with said worm and said rack, the helix angle of the threads formed on said planet rollers threads being the same as that of the worm threads and of opposite direction whereby the planet rollers rolling without slip on the worm are held against an axial movement in relation to said worm.

The planet threaded rollers are held in position about said worm by a retainer ring consisting of a pair of flanges formed with holes in which the ends of said planet rollers are journaled.

According to a contemporary feature characterizing this invention, the aforesaid screw-threaded planet rollers roll likewise, in the lower portion of their path, on an auxiliary rack formed on a surface consisting of one portion of a cylinder coaxial to the worm and to the main rack overlying said worm, the length of this auxiliary rack being substantially equal to that of said worm. The auxiliary rack consists of a multithread internal screw thread of which the pitch is so selected that the pitch of the assembly comprising the driving worm, the auxiliary rack and the screw-threaded planet rollers is zero. Under these conditions, the longitudinal movement of the auxiliary rack is zero in relation to said worm, and this rack may then be used as a stop for transmitting to the frame structure the load applied by the main rack to the driving worm.

With this last arrangement a considerably rigidity can be obtained in the assembly. Thus, the driving worm trunnions may have relatively small geometrical dimensions without inasmuch reducing the load capacity of the assembly. Besides, with this arrangement, it is possible to construct an adjustable or play takeup rack driving system. In this case, the driving worm consists of a pair of externally screw-threaded half rings adapted to slide without rotating on a common shaft. The movement of these half-rings toward each other permits of simultaneously taking up or adjusting the axial play and the radial play of the assembly comprising the worm, planet rollers, main rack and auxiliary rack.

It is thus clear that with this invention mechanisms for transforming a movement of rotation into a movement of translation can be constructed by using rack and worm elements, with a high efficiency and the possibility of taking up play. The device according to this invention appears to be particularly advantageous in the case of large-size machine tools or other mechanical assemblies requiring very long strokes.

BRIEF DESCRIPTION OF THE DRAWINGS

In order to afford a clearer understanding of this invention and of the manner in which the same may be carried out in the practice a typical form of embodiment thereof will now be described by way of illustration with reference to the accompanying drawings, in which.

DESCRIPTION OF THE PREFERRED EMBODIMENT

Figure 1:
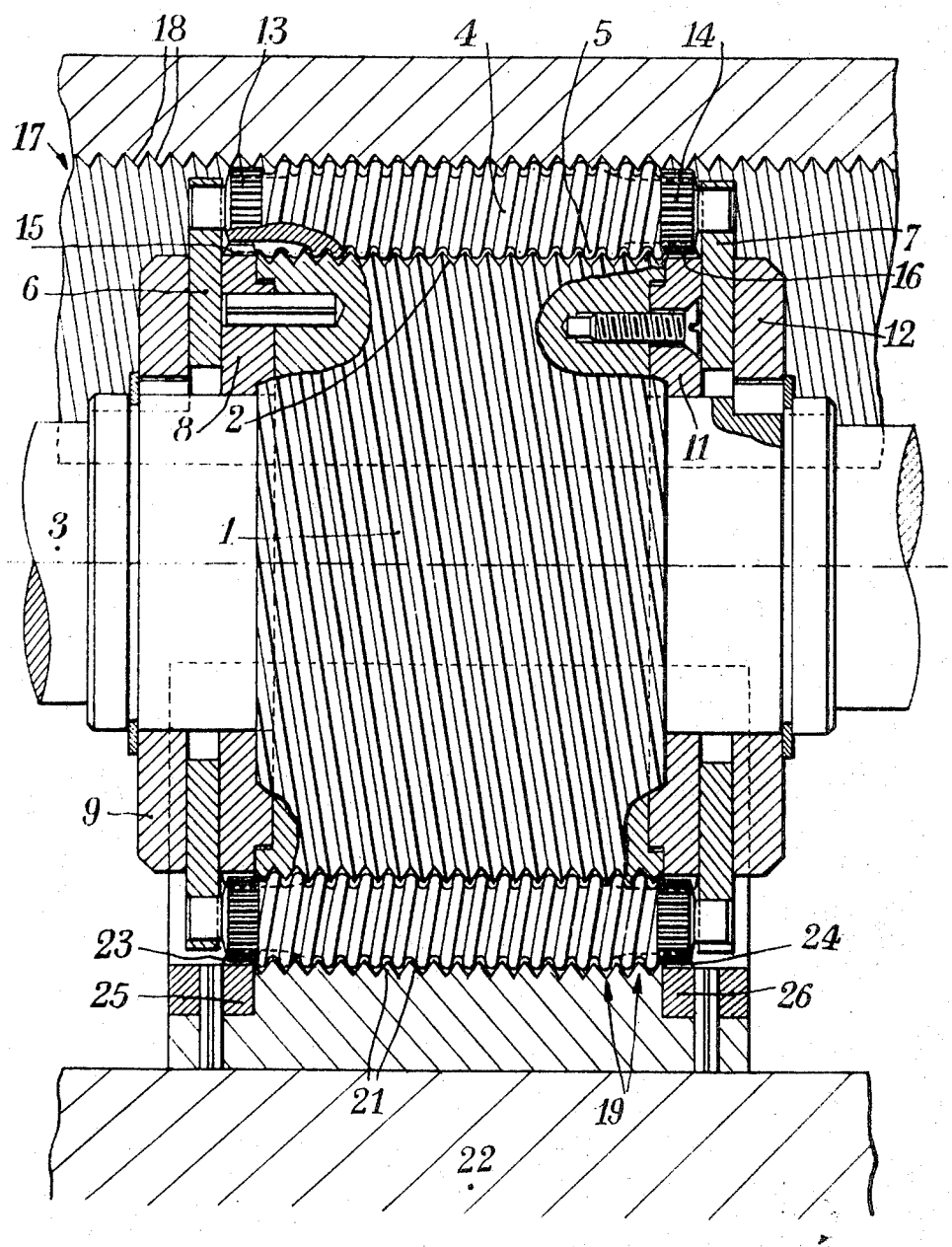
FIG. 1 is an axial section showing a motion-transforming mechanism of the rack and worm type according to this invention.
Figure 2:
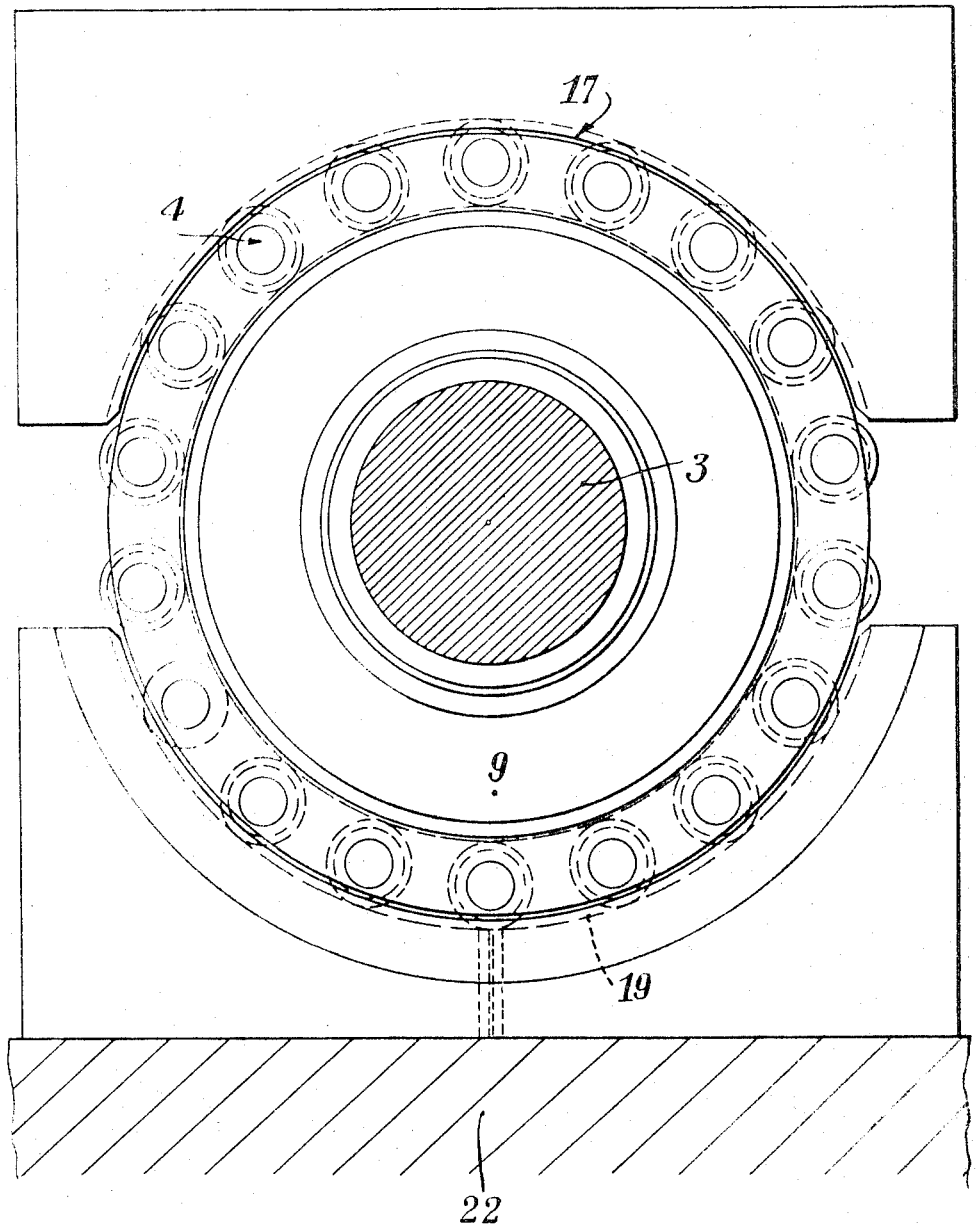
FIG. 2 is a cross-sectional view of the mechanism.

The device illustrated in the drawing comprises a multithread driving worm 1 formed with a plurality of screw threads 2, for example eight in number, as illustrated in the drawing. The driving worm 1 is rigid with a primary shaft 3 providing the rotational drive.

Surrounding the driving worm 1 at spaced angular intervals are externally screw-threaded planet rollers 4 constituting single-thread screws 5. These planet rollers 4 are in constant screw engagement with the driving worm 1, and the helix angle of threads 5 of planet rollers 4 is equal to that of the threads 2 of worm 1 and of opposite direction, so that the planet rollers 4 which roll without slipping on the worm 1 cannot move axially in relation thereto.

The screw-threaded planet rollers 4 are retained in position about the worm 1, by means of a retainer ring cage or like structure consisting of a pair of annular flanges 6, 7 formed with holes having trunnioned therein the ends of the planet rollers 4. The annular flange 6 is disposed between a toothed annular member 8 secured to the front or end face of worm 1 and a thrust ring 9 locked against axial movement on shaft 3, and similarly the other annular flange 7 is disposed between another toothed annular member 11 secured to the opposite front or end face of worm 1 and a thrust ring 12 locked against axial movement on shaft 3. The cagelike assembly consisting of flanges 6 and 7 can rotate freely about the axis of worm 1 while being held against axial movement by the annuli 8, 11 and rings 9, 12.

A possible parasitic slip of the screw-threaded planet rollers 4 in relation to the main worm 1 is controlled by cutting the teeth 13 and 14 at the ends of the planet rollers, these teeth meshing with the teeth 15 and 16 of rings 8 and 11, respectively.

The device further comprises a rack 17 overlying the worm 1 and consisting of a part-cylindrical surface formed with internal threads 18 constituting a multithread tapping. As a rule, the number of threads 18 of this rack 17 is equal to that of the threads 2 of driving worm 1. Besides, the dimensions of the threads 18 of rack 17 and the dimensions of the threads 2 of worm 1 are identical, so that the screw-threaded planet rollers 4 interposed between said worm 1 and rack 17 can mesh with both threads 18 and 2 of rack 17 and worm 1, respectively.

The driving worm 1 may be carried by bearings in which the input or drive shaft 3 is journaled. However, in the specific form of embodiment illustrated in the drawing this bears via said screw-threaded rollers 4 upon a lower auxiliary rack 19 of a length corresponding substantially to that of worm 1. The inner surface of this rack consists of a cylinder portion formed with a multithread tapping 21.

For controlling the possible parasitic slip between the screw-threaded planet rollers 4 and these threads 21 the teeth 13 and 14 of rollers 4 are kept in meshing engagement with teeth 23 and 24 respectively, these teeth being cut in annular sectors 25 and 26 secured to the two end faces of said auxiliary rack 19.

The pitch of the auxiliary rack 19 is so selected that the pitch of the assembly comprising the driving worm 1, the screw-threaded planet rollers 4 and the auxiliary rack 19 is zero, as will be seen presently. In this case, the longitudinal movement of the auxiliary rack 19 with respect to the worm 1 is also zero and said auxiliary rack can thus be used as a radial abutment member for transmitting to the frame structure 22 the load applied by the main rack 17 to the driving worm 1 via the screw-threaded planet rollers 4 in their upper position. With this arrangement the dimensions of the trunnions, or those of the drive shaft 3, can be reduced appreciably without inasmuch reducing the load capacity of the assembly, and on the other hand it is possible to construct an adjustable or play takeup system. In this case, the driving worm 1 consists of a pair of externally screw-threaded half rings adapted to slide without rotating on a common shaft. The movement of these half rings towards each other will then permit of simultaneously taking up adjusting the axial play the radial play developing in the assembly comprising the driving worm 1, planet rollers 4, main rack 4 and auxiliary rack 19.

A simple calculation will show that the resultant pitch of the above-described device is given by the formula:

$$P = \frac{P_1 D_2 + P_2 D_1}{D_1 + D_2}$$

wherein $P_1$ denotes the pitch of worm 1, $P_2$ the pitch of rack 17, $D_1$ the diameter of worm 1 and $D_2$ the rack diameter.

When in the general case contemplated the pitch of rack 17 is selected to have the same value as the pitch of worm 1, the resultant pitch of the assembly is also equal to the worm pitch.

In a specific form of embodiment given by way of example, the worm 1 has eight 3-millimeter threads and the planet rollers 4 have one 3-mm. thread, in the opposite direction with respect to those of the worm. The main rack 17 has eight 3-mm. threads in the same direction as the worm threads, and the auxiliary rack has 10 3-mm. threads in a direction opposite to that of the worm threads. The diameter of worm 1 is 120 mm. that of planet rollers 4 is 15 mm. and the diameter of the two racks 17 and 19 is 150 mm.

If we apply the resultant pitch formula given hereinabove it will be seen that the resultant pitch of worm 1 in relation to the auxiliary rack 19 is zero, and that the resultant pitch of the same worm 1 in relation to the main rack 17 is equal to the worm pitch, i.e. 24 mm.

Of course, the forms of embodiment described and suggested hereinabove by way of example with reference to the attached drawing should not be construed as limiting the basic principle of the present invention, since various modifications may be brought thereto without departing from the spirit and scope of the invention as set forth in the appended claims.

What I claim is:

1. A device adapted to be mounted on a frame structure for transforming a movement of rotation into a movement of translation, comprising a main rack consisting of a part-cylindrical surface formed with a plurality of internal threads, a worm coaxial to said rack and having a plurality of external threads, externally screw-threaded planet rollers disposed about said worm and simultaneously engaging the threads of said worm and said main rack, said main rack and worm adapted for relative longitudinal movement upon rotation of said worm, the helix angle of the threads formed on said planet rollers being identical with that of the worm threads and of the opposite direction, whereby said planet rollers, by rolling without slipping on said worm, are prevented from moving longitudinally in relation thereto, and an auxiliary rack consisting of a part-cylindrical surface formed with a plurality of threads having a predetermined pitch, the length of said auxiliary tack being substantially identical with that of said worm, whereby said screw-threaded planet rollers can roll, during the lower portion of their path, on said auxiliary rack, the pitch of the multithread tapping of said auxiliary rack being predetermined so that the pitch of the assembly comprising said worm, said auxiliary rack and said screw-threaded planet rollers is zero whereby longitudinal movement of the auxiliary rack is zero in relation to said worm so that the auxiliary rack serves as a stop to transmit to the frame structure load applied by said main rack to said worm.

2. A device as set forth in claim 1, which comprises a pair of annular flanges and holes formed through said flanges, in which the trunnion-forming ends of said screw-threaded planet rollers are adapted to be journaled, whereby both flanges constitute a cage holding said screw-threaded planet rollers in position about said worm.